United States Patent [19]
Dawson

[11] 4,204,388
[45] May 27, 1980

[54] AIR CUSHION MOWERS

[75] Inventor: Frank Dawson, Littleover, England

[73] Assignee: Qualcast (Lawn Mowers) Limited, Sunnyhill, England

[21] Appl. No.: 929,663

[22] Filed: Jul. 31, 1978

[51] Int. Cl.² ...................... A01D 35/20; A01D 53/00
[52] U.S. Cl. ................................ 56/320.1; 56/DIG. 3
[58] Field of Search ............... 56/12.8, 320.1, DIG. 3; 180/216

[56] References Cited

U.S. PATENT DOCUMENTS

| | | | |
|---|---|---|---|
| 3,110,996 | 11/1963 | Dalhman | 56/12.8 |
| 3,338,038 | 8/1967 | Camph | 56/12.8 |
| 3,550,718 | 12/1970 | Knuth | 180/116 |
| 3,838,558 | 10/1974 | Goodchild | 56/DIG. 3 |
| 3,877,206 | 4/1975 | Cody et al. | 56/DIG. 3 |
| 3,912,038 | 10/1975 | Bernaerts | 180/116 |

FOREIGN PATENT DOCUMENTS

| | | | |
|---|---|---|---|
| 1298346 | 6/1969 | Fed. Rep. of Germany | 56/DIG. 3 |
| 2337721 | 2/1975 | Fed. Rep. of Germany | 56/DIG. 3 |
| 1448539 | 9/1976 | United Kingdom | 56/DIG. 3 |

Primary Examiner—Louis G. Mancene
Assistant Examiner—Paul J. Hirsch

[57] ABSTRACT

A lawnmower comprises a generally dome-shaped plenum chamber for supporting a motor or engine, a cutter and an air-impeller mounted for rotation within the said chamber, an air intake positioned centrally in the roof of said chamber above said impeller such that, in use, the impeller produces a cushion of air in the chamber bounded by a vortiginous air curtain, a peripheral flange extending outwardly from the bottom edge of said chamber in a direction substantially parallel to the ground, and means associated with said flange for partially trapping the turbulent air escaping from the said chamber beneath said flange whereby the rate of air loss from the said cushion is substantially reduced.

6 Claims, 1 Drawing Figure

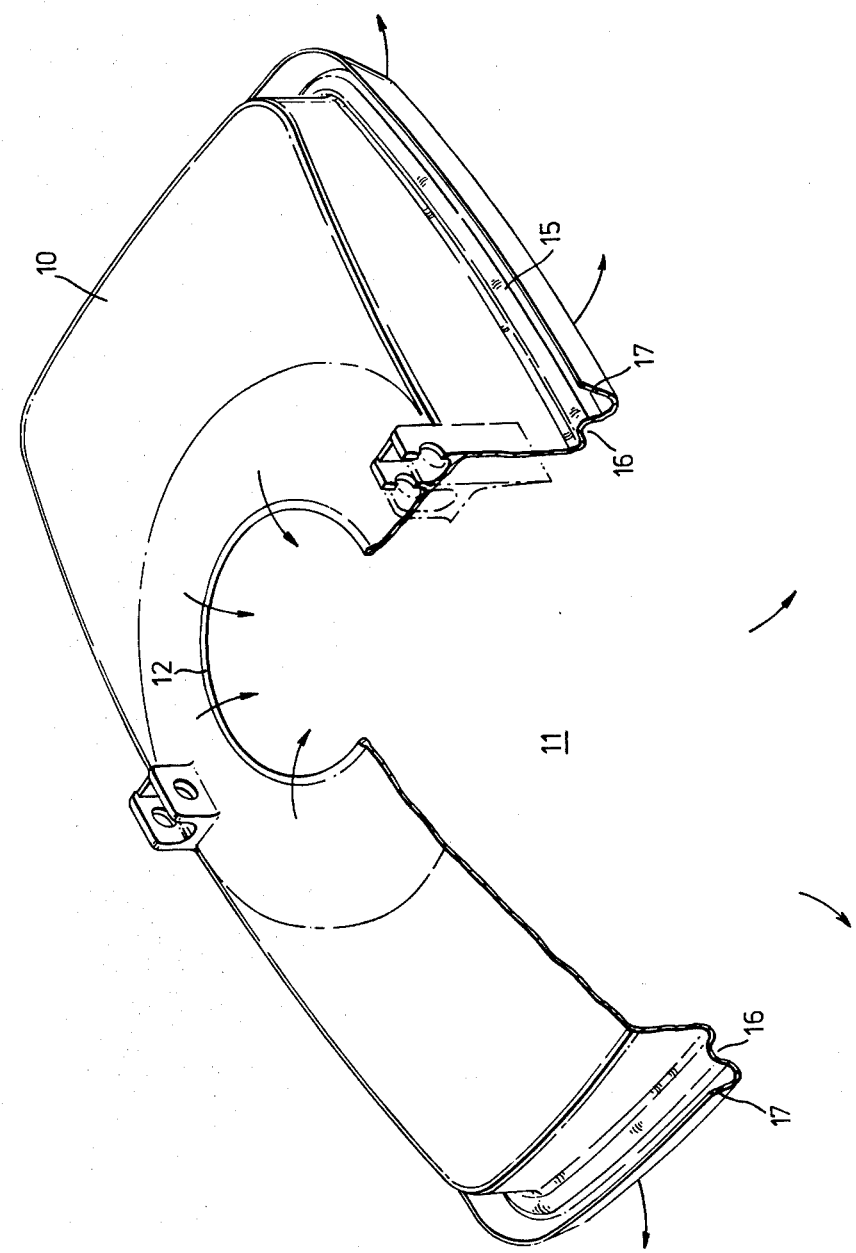

AIR CUSHION MOWERS

This invention relates to the type of 'floating' mower which, in use, is supported on an air cushion. One such mower is described, for example, in British Pat. No. 929610.

In accordance with the present invention there is provided a mower comprising a cutter and an air-impeller mounted for rotation within a generally dome-shaped plenum chamber, the roof of the chamber having a central air intake above the impeller such that, in use, the impeller produces a cushion of air in the chamber bounded by a vortiginous air curtain, the vortiginous air escaping through the gap between the bottom edge of the chamber and the ground, and the chamber being provided with a peripheral flange extending outwardly from the said bottom edge in a direction substantially parallel with the ground, the flange including means partially trapping the escaping turbulent air to reduce the rate of air loss from the cushion.

Because of the reduced rate of air loss, it becomes easier to build up pressure in the plenum chamber and the power required to lift the mower is correspondingly reduced. Accordingly the weight of the mower assembly can be reduced because less powerful motors will be required to produce the same degree of lifting force.

In general the effectiveness of the air curtain and the air trapping means should not be so great that the grass or other vegetation being cut by the cutter is not ejected from beneath the chamber. Failure to eject the cuttings can lead to clogging, and this in turn can impede the action of the cutter.

The air trapping means preferably comprises a groove or recess in the lower surface of the flange, the groove or recess extending completely around the flange and preferably having an inverted V or U-section. Such a groove or recess also strengthens the flange since it provides a strengthening or stiffening rib. Where the chamber is moulded as a one-piece construction, this strengthening or stiffening rib assists in maintaining the flange substantially flat as it cools immediately after being removed from the mould.

A further advantage of providing such a groove or recess in the flange is that it assists in stabilising the mower when the motor is running, probably due to a vacuum effect created in the groove sucking back the deck forming the chamber if it tilts in the opposite direction.

By way of example only, an embodiment of the invention will now be described with reference to the accompanying drawing in which the sole FIGURE is a partially cut-away perspective view of the deck of an air-cushion mower.

The illustrated deck is an irregular, generally dome-shaped moulded one-piece structure with a flattened top having a central, circular opening 12. The annular flange of a motor end bracket (not shown) is secured around the rim of the circular opening 12 by means of nuts and bolts.

For simplicity, the motor and the mounting bracket are not shown in the drawing but, when assembled, will include a vertical drive shaft passing through the centre of the circular opening 12, the shaft carrying rotary cutter blades as well as curvilinear air-impeller blades which, in use, draw air into the plenum chamber 11 through the opening 12. The blades are designed to produce the maximum possible air movement in the chamber (rather than maximum possible pressure in the chamber) to offset the constant air loss from the air cushion produced in the chamber. The curved blades are thus rotated in a direction which excites the air centrifugally, each blade having a leading convex face and a trailing outside radius tip. By this means the air is drawn in at the centre of the impeller and accelerated outwards.

As is well known, when the bottom of chamber 11 is close to the ground, the flow of air produced by such impeller blades will produce a central air cushion in the chamber bounded by turbulent air. Some of this turbulent air will escape from beneath the plenum chamber (as shown by the arrows in the figure) and will carry with it the cut grass. To restrict this outward flow of air, the deck 10 is formed with a rim 15 extending outwardly generally parallel to the ground, this rim being formed with a groove 16 which extends completely around the deck so that it lies substantially transverse to the outward flow of air at any point around the rim.

As the turbulent air flows out beneath the rim, it becomes partially trapped in the groove 16 and forms a circulating air stream which acts as a further air curtain impeding the outward flow of air. Preliminary tests have shown that less power is needed to maintain an equivalent lift when using a grooved rim compared to a non-grooved rim.

The groove 16 is preferably of an inverted V-section with an included angle lying in the range 50° to 70°. It thus additionally provides a stiffening rib which is useful in maintaining the rim flat, particularly when, during manufacture, the moulded structure is cooling after being removed from the mould. Without such a rib, the rim is liable to curl or deform during cooling of the mould.

The outer edge of the rim is preferably formed with an upturned lip 17, the lip being of constant height around the periphery of the deck and having a top surface lying in a horizontal plane. This upturned lip assists smooth movement of the mower through the grass or other vegetation being cut.

The deck also includes handle mounting brackets 18 located on each side of the central opening 12.

I claim:
1. A lawnmower comprising:
   a generally dome-shaped plenum chamber for supporting a motor or engine,
   a cutter and an air-impeller mounted for rotation within the said chamber,
   an air intake positioned centrally in the roof of said chamber above said impeller such that, in use, the impeller produces a cushion of air in the chamber bounded by a vortiginous air curtain,
   a peripheral flange extending outwardly from the bottom edge of said chamber in a direction substantially parallel to the ground,
   and means associated with said flange for partially trapping the turbulent air escaping from the said chamber beneath said flange whereby the rate of air loss from the said cushion is substantially reduced.

2. A lawnmower according to claim 1 in which the said means associated with the flange comprises a groove bounding the said chamber and formed in the downwardly facing surface of the flange.

3. A lawnmower according to claim 2 in which the groove is of a generally inverted V-section.

4. A lawnmower according to claim 3 in which the inverted V-section has an included angle lying in the range of 50°–70°.

5. A lawnmower according to claim 1 in which the outer edge of the flange includes an upturned lip, the lip being of substantially constant height and extending completely around the flange.

6. A deck for supporting the motor or engine of a lawnmower, the deck comprising:

a generally dome-shaped plenum chamber, an opening positioned centrally in the roof of the said chamber, a peripheral flange extending outwardly from around the base of the said chamber, and a groove formed in the downwardly facing surface of the said flange, the groove extending completely around the flange and having a generally inverted V-section.

* * * * *